(12) United States Patent
Ramakrishnan

(10) Patent No.: US 7,620,609 B2
(45) Date of Patent: Nov. 17, 2009

(54) GENETIC ALGORITHM BASED APPROACH TO ACCESS STRUCTURE SELECTION WITH STORAGE CONSTRAINT

(75) Inventor: Srinivasan Ramakrishnan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 278 days.

(21) Appl. No.: 11/364,344

(22) Filed: Mar. 1, 2006

(65) Prior Publication Data
US 2007/0208691 A1 Sep. 6, 2007

(51) Int. Cl.
*G06F 15/18* (2006.01)
*G06F 15/00* (2006.01)

(52) U.S. Cl. .............................. 706/13; 706/19; 706/16

(58) Field of Classification Search .................... 706/13, 706/19, 16; 707/2, 1
See application file for complete search history.

(56) References Cited

OTHER PUBLICATIONS

Horng et al., Jorng-Tzong, "Materialized View Selection Using Genetic Algorithms in a Data Warehouse System", IEEE, 1999.*

Yu et al., Jeffrey, "Materialized View Selection as Constrained Evolutionary Optimization", IEEE, 2003.*
Aouichi, et al., Kamel, "Automatic Selection of Bitmap Join Indexes in Data Warehouses", Springer, 2005.*
Gupta et al., Himanshu, "Index Selection for OLAP", 1997.*
Lee et al., Minsoo, "Speeding Up Warehouse Physical Design Using A Randomized Algorithm", 1999.*

* cited by examiner

*Primary Examiner*—David R Vincent
*Assistant Examiner*—Adrian L Kennedy
(74) *Attorney, Agent, or Firm*—Hanify & King, P.C.

(57) ABSTRACT

A configuration that minimizes cost subject to the constraints is selected. A Simple Genetic Algorithm (SGA) is modified to incorporate the handling of constraints. The SGA is further modified to incorporate Optimal-Storage-Profiling to produce an increased number of fit individuals in each generation, developing a policy which will consider configurations of all storage-consumption levels and favor those configurations whose storage-consumption indicate they more likely to be strong candidates. An ideal-distribution of configurations, based on their storage-consumption, for each generation is developed. Different elitist policies are also incorporated to achieve greater scalability without sacrificing the quality of the solution.

33 Claims, 6 Drawing Sheets

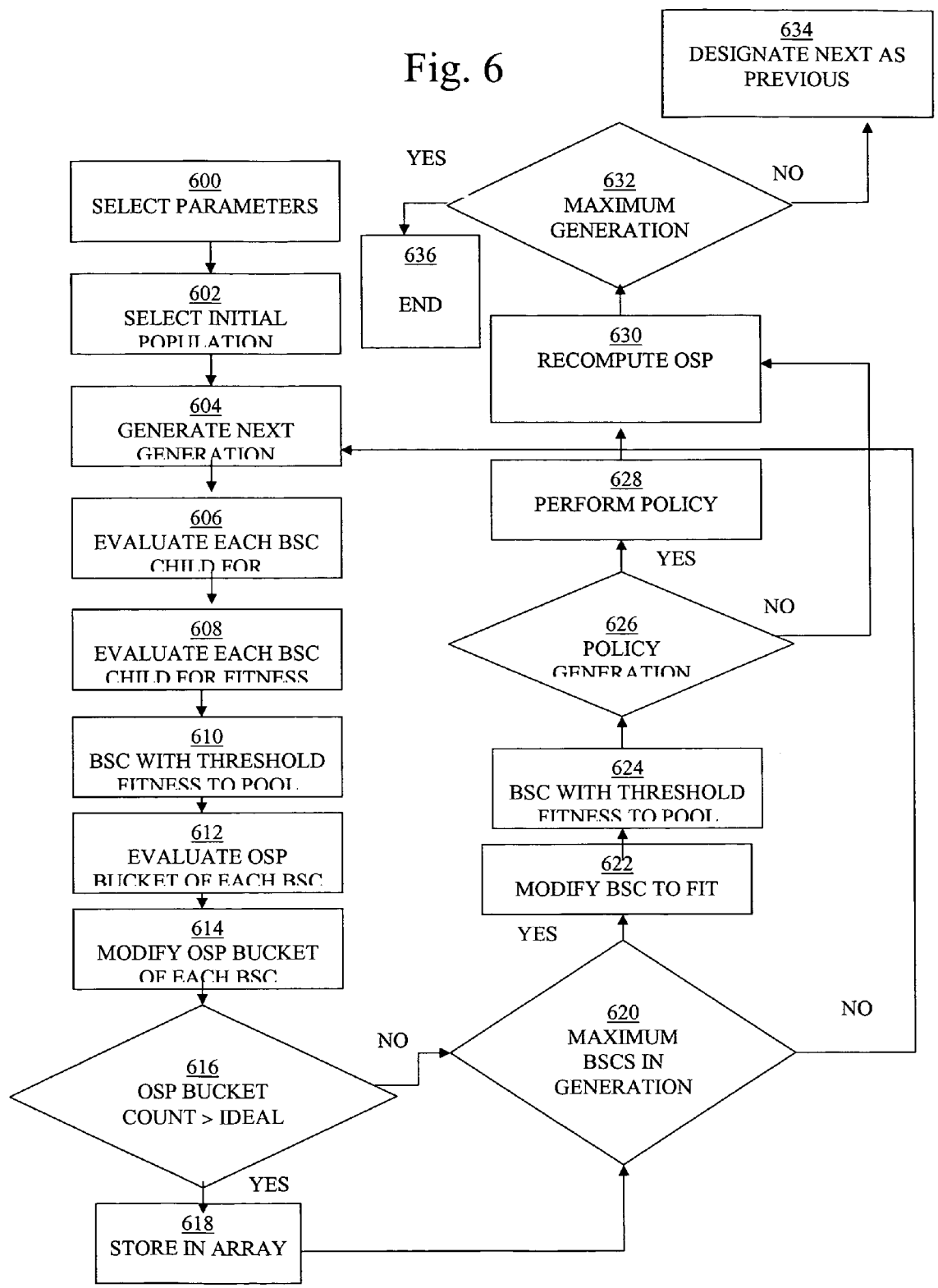

GENETIC ALGORITHM BASED APPROACH TO ACCESS STRUCTURE SELECTION WITH STORAGE CONSTRAINT

BACKGROUND OF THE INVENTION

1. Field of the Invention

The present invention relates to the proper selection of access structures in a database system which are vital for achieving high performance. In particular, the present invention relates to a method and system for the selection of access structures in a manner which is fast, efficient, scalable and of high quality.

2. Description of the Related Art

In a typical relational database system users store, update, and retrieve database data by interacting with information retrieval applications. Information retrieval applications make use of database access structures when performing content-based searches on the database data in the database. Database access structures are auxiliary structures maintained by the database system which provide organization and reference to the data in a database system to permit a user to find particular items of data in the database, determine relationships among the data in the database, and also permit relationships between the data in a database system and data not included in the database system to be determined. The primary reason that access structures are widely deployed is they improve the performance of the user's queries. Examples of database access structures include indexes and materialized views. Among indexes, there are a number of different types supported by database systems such as R-trees, quadtrees, B-trees, bitmap and functional indexes. Materialized views are a more recent addition to database systems. They are database objects which contain the results of a query, which is called the defining query of the materialized view. The defining query, which may itself contain references to other database objects such as tables, views and even other materialized views.

Thus there is an abundance of options available among database access structures which can be used to provide better performance for end-user queries. The proper selection of access structures from among all these choices is vital for optimal performance of a database system.

Generally, modern database systems provide tools for monitoring and improving the performance of the system. The Access Advisor is one such tool, which can be used to assist in the selection of access structures. The target audience for the Access Advisor is the database administrator (DBA), a person whose job it is to keep the database running smoothly and troubleshoot performance problems that may arise from time to time.

The primary input to the Access Advisor is a set of queries, which the DBA wishes to tune for performance. These queries represent a workload to the database system, and may come from a variety of sources, such as real queries run by users or from a synthetic benchmark or queries which simulate the actual queries submitted to the database system. In addition to the workload, the DBA may wish to place constraints on the nature of the access structures which may be chosen by the tool. Constraints may include, but are not limited to, the storage-space available for access structures and the maximal number of indexes on a table. The output of the Access Advisor is a set of recommendations. A recommendation includes a set of actions. An action represents an actionable piece of advice provided by the Access Advisor to the DBA to achieve desirable performance subject to the constraints placed on the solution. An action can include the creation of a new access structure, the retention of an existing access structure, or the deletion ("dropping") of an existing access structure. The output of the Access Advisor also includes a cost-based analysis for the generated recommendations. This analysis demonstrates the benefits and improvements of adopting the recommendations for the specified workload. Each recommendation may benefit one or more queries in the workload. The greater the number of queries that can benefit from a recommendation, the greater its usefulness. Actions may also be shared among multiple recommendations, thereby enhancing their usefulness.

The usefulness of recommendations and actions for a given query in the workload is quantitatively analyzed using a metric known as the query-cost. The component in the database system responsible for computing the cost is the Optimizer, hence these numbers are also referred to as optimizer-costs. The two costs of a query which are of significance to the Access Advisor are the pre-cost and post-cost. A query's pre-cost is the cost of computing the result of the query with an initial configuration, which is defined as the state of the database system at the time the Access Advisor is run. A query's post-cost is the cost of computing the result of the query using a recommendation. The post-cost is dependent on the recommendation chosen for a query. During its analysis the Access Advisor will consider several alternative (or candidate) recommendations for each query, each having a unique post-cost for the query. The difference between the pre-cost and the post-cost of a recommendation for a given query is the performance improvement for the query using that recommendation, It may appear that recommendations which offer the highest performance improvement are always to be preferred, and the Access Advisor has merely to choose those with this characteristic. However, it is not so simple, because in addition to the performance improvement enabled by the recommendations, the Access Advisor must also consider the cost of deploying the access structures comprising the recommendations. The cost of access structures is essentially the cost of creating them and the cost of maintaining them when the underlying data in the database system changes. Thus the problem of access structure selection essentially entails trading off the query performance improvement which can arise from new access structures with the creation and maintenance costs of the structures themselves. Since recommendations may overlap and the benefits of a recommendation is only realized when all the actions of a recommendation are performed, recommendations which are widely useful across queries and which share access structures are more likely to be useful, and the task of the Access Advisor becomes one of balancing the competing interests of improving the performance of individual queries versus the costs of access structures introduced specifically for each query.

The selection of an optimal set of recommendations from all the candidate recommendations for a given workload and set of constraints is a daunting one, and essentially intractable, especially, when a large number of queries are present in the workload. The complexity of the problem is further increased when constraints placed on their solution is considered. Two constraints of practical significance are selecting access-structures whose combined storage requirements are less than a value specified by the DBA. This value is denoted by STORAGE_LIMIT. Secondly the DBA may specify a limit on the maximum number of indexes per table, which is denoted by IPT_LIMIT. The term configuration is used to denote a set of candidate recommendations, and the candidate recommendations are themselves called basic-configurations. A configuration that satisfies a specified constraint is deemed to be feasible. An optimal set of recommendations ("the optimal configuration") is the lowest-cost feasible configuration This is known to be essentially impossible to find with certainty in reasonable length of time. The term reasonably-optimal configuration is used to denote a configuration which is likely, but not known with absolutely certainty to be an optimal solution or fairly close to it.

There is a need for a method of selecting a reasonably-optimal configuration that is fast, efficient, scalable and produces high quality results. There is a need for the method to execute quickly. There is a need for the method to consume minimal computational resources during execution. There is a need for the method to deal with large-size inputs, and the quality of results is measured by how close the results are to the optimal.

SUMMARY OF THE INVENTION

According to embodiment of the present invention, a method, system, and computer program product for selecting a configuration that minimizes cost subject to the constraints are provided. According to an embodiment of the present invention, a Simple Genetic Algorithm (SGA) is modified to incorporate the handling of constraints. In an embodiment of the present invention, the SGA is further modified to incorporate a technique called Optimal-Storage-Profiling to produce an increased number of fit individuals in each generation and develop a policy which will consider configurations of all storage-consumption levels and favor those configurations whose storage-consumption indicate they are more likely to yield strong candidates. According to an embodiment of the present invention, an ideal-distribution of configurations, based on their storage-consumption, for each generation is developed. In an embodiment of the present invention, elitism is also incorporated.

BRIEF DESCRIPTION OF THE DRAWINGS

The above described features and advantages of the present invention will be more fully appreciated with reference to the detailed description and appended figures in which:

FIGS. 5-6 depict a method of selecting a configuration that minimizes cost subject to the constraints.

DETAILED DESCRIPTION OF THE INVENTION

Figure 1:
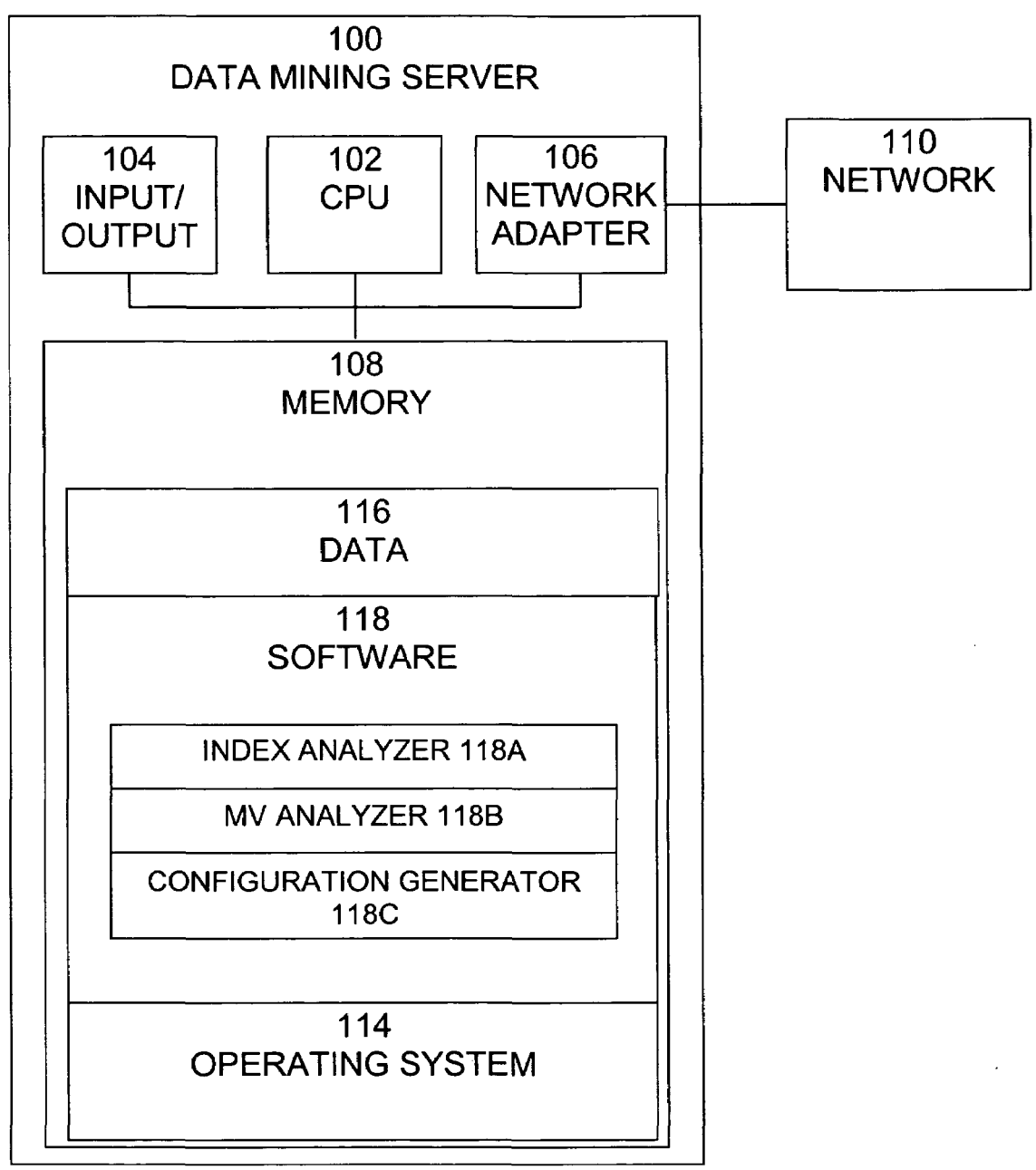
FIG. 1 depicts an exemplary block diagram of a system according to an embodiment of the present invention.

An exemplary block diagram of a system 100 which can find application according to an embodiment of the present invention is shown in FIG. 1. In the FIG. 1 embodiment of the present invention, system 100 includes input/output device interface, and display interface 104 and network adapter 106, system memory 108 and CPU 102. The CPU 102 is connected by a bus 112 or other suitable interface means to system memory 108, input/output device interface, and display interface 104 and network adapter 106. The CPU 102 executes program instructions in order to carry out the functions of the present invention.

Input/output device interface 104 provides the capability to input data to, or output data from, system 100. Input/output device interface 104 includes, but is not limited to, input devices such as scanners, keyboards, etc., output devices such as video, monitors, printers, etc., and input/output devices such as dialers/modems, etc. Input/output device interface 104 enables input of data and documents, as well as output of reports, email alerts, documents, and search results. Network adapter 106 interfaces system 100 with network 106.

System memory 108 stores program instructions that are executed by, and data that are used and processed by, CPU 102 to perform the functions of system 100. System memory 108 can include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which can use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the FIG. 1 embodiment of the present invention, system memory 108 includes operating system 114, data 116 and software 118. Operating system 114 provides overall system functionality. The data 116 may include any information required to perform the functions of the present invention. The software 118 provides the functionality of the present invention including, but not limited to, an Index Analyzer 118a, a MV Analyzer 118b, and a Configuration Generator 118c. The Index Analyzer 118a generates alternative index candidates for the queries in a workload. The MV Analyzer 118b generates view candidates including, but not limited to, indexes on materialized views. The Configuration Generator (CG) 118c evaluates the generated index candidates and view candidates and calculates an optimal configuration for a workload.

A basic-configuration ("bsc") includes, but is not limited to, a set of actionable candidates ("acg") and a cost for the bsc. An acg is an access structure, such as an index or a materialized view. An acg can be non-existing or existing and consume storage. The storage space consumed by an existing acg is the actual amount of storage used by the acg. The storage space consumed by a non-existing acg, such as an acg to be created, is the estimated amount of storage that the acg will consume once created.

A configuration includes a set of bsc's and a cost. The cost of a configuration C is composed of the query execution-cost (Exe), the maintenance cost (Maint), and the creation cost (Cre). The Exe is the execution-cost of answering all the queries in the workload utilizing the set of bsc's present in the configuration. The maintenance cost (Maint) is the cost of maintaining acg's of the set of bsc's present in the configuration for Data Manipulation Language ("DML") statements present in the workload. DML statements modify the data in the database, thereby potentially causing acg's to be updated. The creation cost (Cre) is the cost of creating the new acg in the workload.

The cost-formula for a configuration is:

$$\text{Cost}(C) = \text{Exe} + w1 \cdot \text{Maint} + w2 \cdot \text{Cre} \qquad \text{Eqn (1)}$$

In Eqn (1), w1 and w2 represent weighting-factors for maintenance and creation costs. These weighing-factors can be disabled respectively. If disabled, the corresponding weighting-factor is deemed to be zero. If there is no DML in the workload, the maintenance cost vanishes but the creation cost term does not since it being dependent on the presence of new access structures in the configuration.

An optimal configuration can be characterized as the selection of a configuration C which minimizes the cost subject to the constraints:

Min Cost(C)
C such that Storage(C)<STORAGE_LIMIT, where Storage (C) is the storage consumed by the acg's in the configuration and the count of the indexes present in C on each table is less than the IPT_LIMIT.

A configuration is a set of bsc's chosen from the set of all bsc's. The total number of bsc's available to choose from is denoted by NUMBSC. A fixed-size bit-vector is used to represent each of the bsc's in a configuration since the set of all bsc's is fixed before the CG 118c begins evaluation of index and materialized view candidates. The search-space of potential solutions increases exponentially with the number of bsc's since a bit-vector of size NUMBSC has $2^{\wedge}$NUMBSC combinations. This search-space includes feasible and infeasible solutions. The number of bsc's is dependent on the number of queries in the workload (NUMQRY) and on the nature and complexity of the queries themselves.

Figure 2:
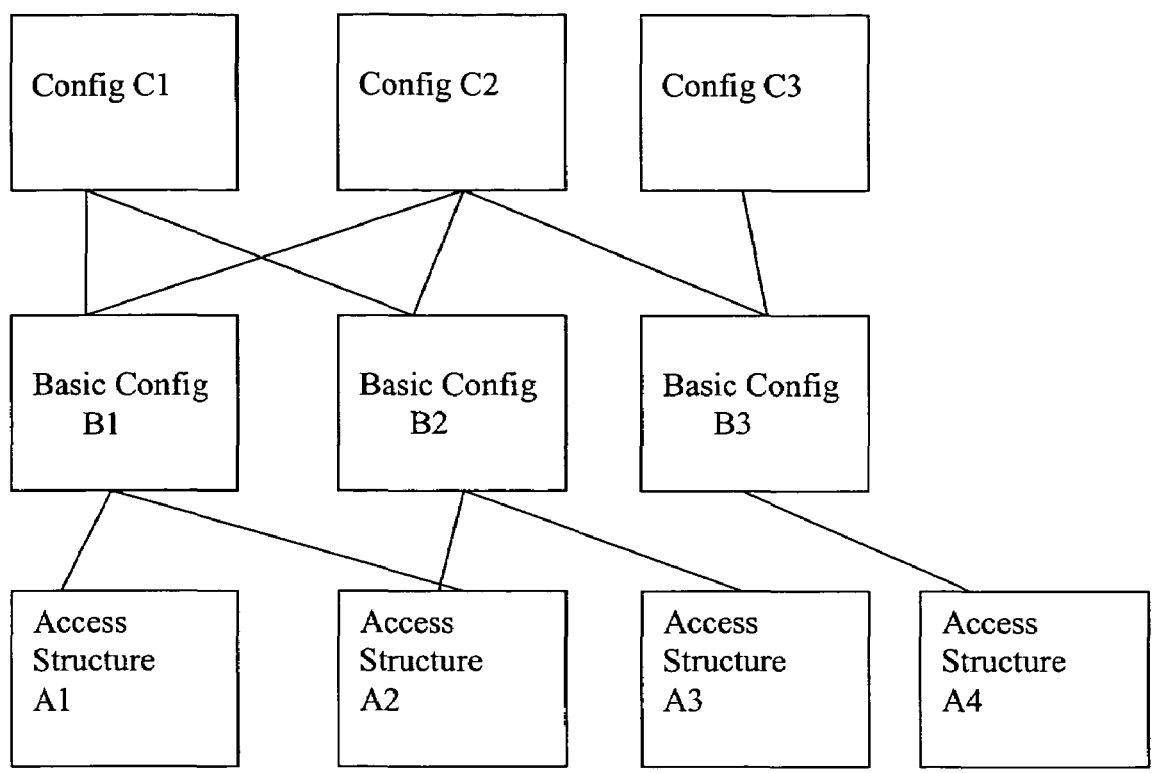
FIG. 2 depicts an exemplary block diagram of the relationship between configurations, basic-configurations, and access structures.

An exemplary block diagram demonstrating relationships which exist between configurations, bsc's or basic-configurations and the acg's or access-structures is shown in FIG. 2. In the FIG. 2 embodiment of the present invention, there are three configurations C1, C2, and C3. The configuration C1 consists of the basic-configurations B1 and B2, the configuration C2 consists of the basic-configurations B1, B2 and B3, and the configuration C3 consists of the basic-configuration B3. The basic-configuration B1 consists of the access-structures A1 and A2, the basic-configuration B2 consists of the access-structures A2 and A3, and the basic-configuration B4 consists of the access-structure A4.

In the present invention, the Simple Genetic Algorithm (SGA) is used as a framework for devising a solution to optimal access structure selection. The SGA has been adapted to incorporate constraint handling to enable its application to optimal access structure selection. These adaptations include, but are not limited to,:

Incorporate constraints so we generate only feasible candidates in the each generation and search only in the feasible regions of the solution space.

Maintain the stochastic nature of genetic algorithms in the generation of the initial population by picking the starting point at random; this ensures that we probe all regions of the search space evenly.

Incorporate a new technique called optimal storage profiling to capture the interaction between the cost function and the storage constraint; this technique increases the chances of finding both the optimal storage and configuration faster.

Incorporate elitism for improving scalability and throughput

The basic principle of standard SGA is to simulate the evolution of individual structures via the processes of selection, mutation and reproduction. These processes depend on the perceived performance of the individual structures in the environment in which they are placed.

Figure 3:
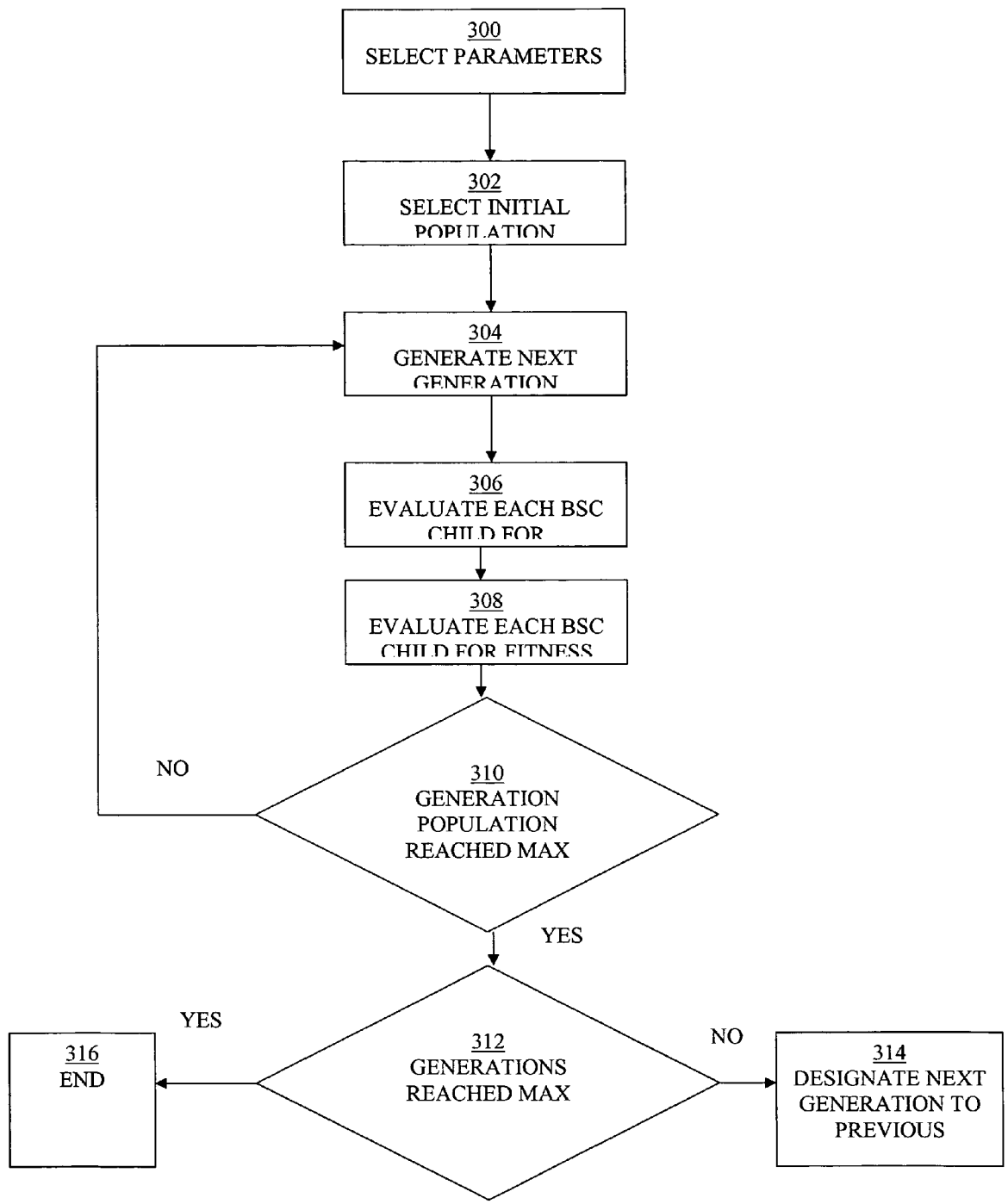
FIG. 3. depicts a method of selecting a configuration that minimizes cost subject to constraints.

FIG. 3. depicts a method of selecting a configuration that minimizes cost subject to constraints. In the FIG. 3 embodiment of the present invention, the method employs a Simple Genetic Algorithm (SGA) modified to incorporate the handling of constraints. In step 300, parameters used by the modified SGA are selected. The parameters include, but are not limited to, population-size ("POPSIZE"), the maximum number of generations ("MAXGEN"), the cross-over probability ("PCROSS"), and the mutation probability ("PMUT"). The POPSIZE is the total number of feasible configurations which are considered in each generation. The POPSIZE is fixed for the duration of the algorithm and dependent on NUMBSC. A generation is a population of offspring bsc's created from a parent population of bsc's. The MAXGEN is dependent on NUMBSC. The crossover probability "PCROSS" is the probability that crossover occurs when two selected configurations mate for reproduction. In an embodiment of the present invention, the "PCROSS" is 0.6. The mutation probability is the probability of a bsc being mutated in a configuration, such as its value being changed from 0 to 1 or 1 to 0 in the bit-string representation of the configuration In an embodiment of the present invention, PMUT's recommended setting is 0.03.

In step 302, the initial population of configurations are randomly chosen and designated as a previous generation. For convenience, each bsc is given a unique integer value in the range 0 through NUMBSC−1. In the FIG. 3 embodiment of the present invention, the configurations, being sets of bsc's, are represented as bit-strings, with '1' representing the presence of a particular bsc in the configuration and a '0' indicating its absence. For example, if NUMBSC is 6, then the initial-population may look like this: 100010, 010110, 011100, . . . . In the FIG. 3 embodiment of the present invention, all configurations are ensured to be feasible by performing storage-constraint and IPT-checks. The generation of feasible candidates is discussed in detail herein below. The initial-population forms the zeroth generation.

In step 304, a subsequent generation of a configuration is produced. The subsequent generation is produced from a preceding generation by performing operations including selection, crossover and mutation. The selection operation includes randomly selecting two configurations from the previous population as parents for reproduction. The probability of a configuration being selected as a parent is directly related to its fitness relative to its peers. The fitness of a configuration is defined as the difference between the cost of the initial configuration and the cost of the configuration itself:

$$\text{Fitness}(C) = \text{Cost}(IC) - \text{Cost}(C) \qquad \text{Eqn (2)}$$

IC denotes the initial configuration, which is the state of the database system at the start of the Access Advisor invocation. Since we consider only configurations that improve the performance of the database system, the fitness can never be negative, as required by SGA. the Cost (C) of the configuration has been defined in Equation (1) herein above.

The crossover operation includes reproducing the selected parents without crossover or with crossover. Reproduction without crossover includes copying the selected parents. Reproduction with crossover includes selecting a crossover-point in each of the parent strings, splitting them at that point to produce four sub-strings, and pasting pairs of the sub-strings together to form two children.

The mutation operation includes randomly perturbing bits in the bit-strings, the probability of which is determined by PMUT. The purpose of mutation is to introduce a degree of randomness into the process, and this can be achieved by perturbing or changing a few randomly selected bits in the bit-string from 0 to 1 or 1 to 0. In step 306, each of the child configurations is evaluated to determine whether they satisfy constraints. The constraints include storage and IPT. In step 308 each of the children is evaluated for fitness. In step 310, it is determined whether the number of configurations in the subsequent generation has reached POPSIZE. If not, the method returns to step 304. If so, then the method proceeds to step 312. In step 312, it is determined whether the maximum number of generations MAXGEN has been reached. If not, the method proceeds to step 314. If so, then the method proceeds to step 316. In step 314, the subsequent generation is designated as the previous generation and the method returns to step 304. In step 316, the method ends. The pseudo-code for the method of FIG. 3 is shown below.

```
Generate initial-population of feasible candidates
for gen := 1 to MAXGEN do
{
    While current-generation is not full (i.e less than POPSIZE) do
    {
        Select parents p1, p2 from previous generation
        Apply the crossover operator to obtain children c1, c2
        Apply the mutation operator to c1, c2
        foreach c in {c1, c2} do:
        {
            /* Validate c against the global constraints (storage, IPT) */
            If it fails the IPT-constraint, drop offending acg's at random until
the constraint is satisfied.
            If it fails the storage-constraint, drop bsc's at random until the
constraint is satisfied.
            Evaluate fitness of c and add it to current generation;
        }
    }
}
```

The method of FIG. 3 keeps track of the "best candidate so far", where a best configuration is available for output at all times if the method is interrupted. The storage requirements of this method are quite small. The main data structures are the two populations, which are arrays, with the size of the arrays being POPSIZE. Each record in the arrays includes a bsc, the bsc's fitness and the bsc's storage size.

The pseudo code of a classic SGA for generating of each chromosome in the initial population is as follows:

```
for (j = 0; j < chromsize; ++j)
{
    if (flip(0.5))
        set j'th bit of chromosome
}
```

In the present invention, a chromosome corresponds to a configuration, which is also referred to as a bit-string. The size of the chromosome is designated by chromsize in the above pseudo-code. In the present invention, chromsize corresponds to NUMBSC, the total number of bsc's available for us to pick from. The boolean function flip(p) returns TRUE with probability p. In classic SGA, this pseudocode demonstrates that there is an equal probability of a bit being chosen or not chosen in a chromosome. While this method is a simple way to generate random populations of chromosomes, it does not guarantee that the chosen chromosomes will satisfy any constraints. Thus this method needs to be modified considerably for our purposes of generating an initial population of random configurations which satisfies the constraints in a fast and efficient manner. This is done in the method shown in FIG. 4.

Figure 4:
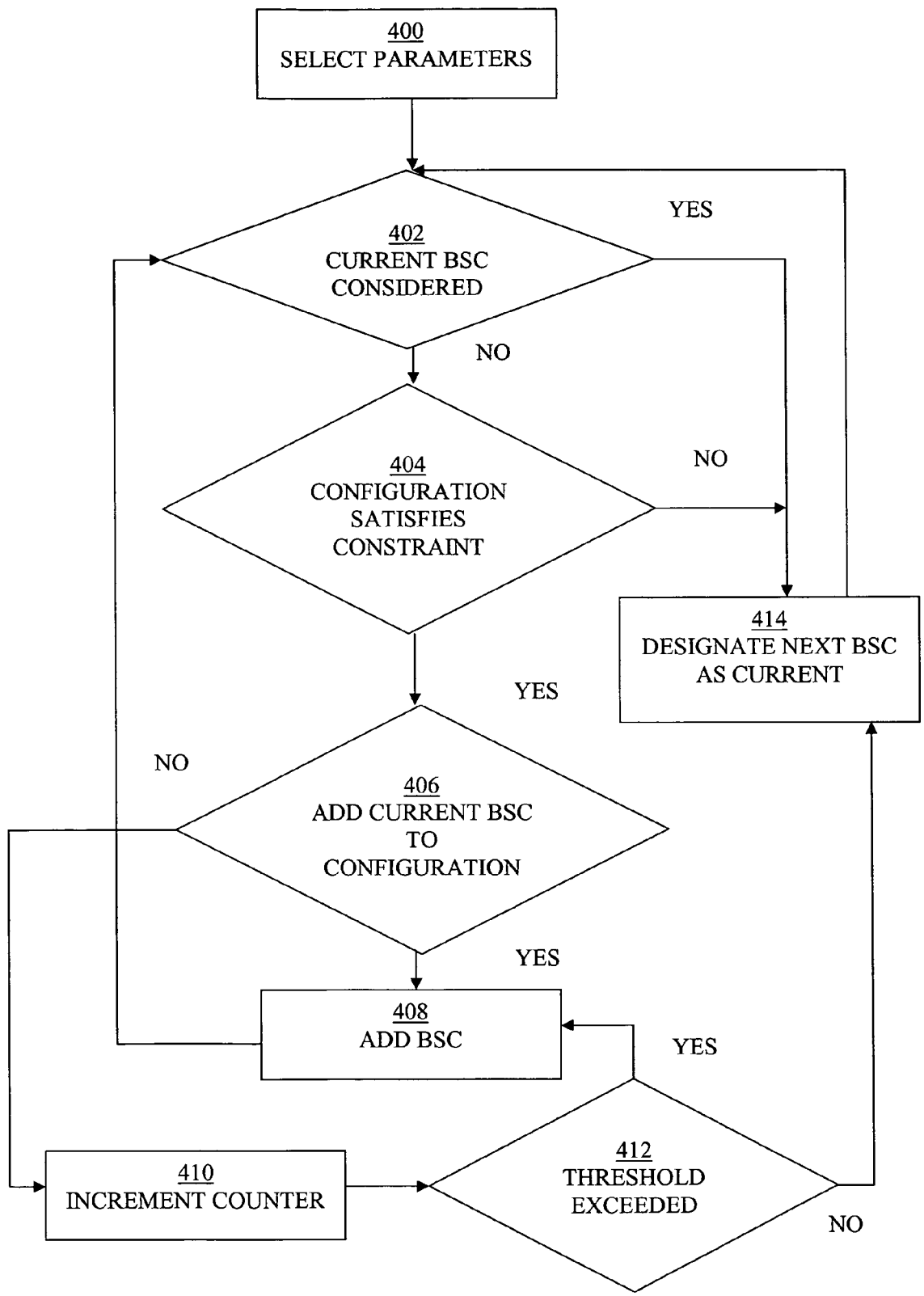
FIG. 4 depicts a method of generating a feasible configuration in the initial population.

FIG. 4 depicts a method of generating a feasible configuration in the initial population. In the FIG. 4 embodiment of the present invention, the method employs a modification of the classic SGA method for generating a configuration in the initial population satisfying the storage and IPT constraints. In step 400, parameters used by this process are selected. The parameters include, but are not limited to, the number of times a valid bsc was not selected ("noop-count") and a randomly selected starting bsc ("jstart") The configuration corresponds to the configuration being populated. Initially, the configuration will be empty. As the method of FIG. 4 executes the configuration will be populated with bscs' that satisfy the constraints.

In step 402, it is determined whether the current bsc is deemed suitable for addition to the current configuration. In an embodiment of the present invention, to be deemed suitable, the bsc must be available and not previously chosen. If not, the method proceeds to step 414. If so, the method proceeds to step 404. In step 404, it is determined whether the configuration including the current bsc satisfies the constraints. If so, the method proceeds to step 406. If not, the method proceeds to step 414. In step 406, it is randomly determined, using the flip function, whether the current bsc should be added the configuration population. If the bsc is chosen, it is added to the configuration in step 408, and the method proceeds to step 402. If not, in step 410, the noop_count is incremented, and it is determined in step 412 whether this counter exceeds a threshold number, which is chosen to be twice the chromosome-size. If the noop_counter exceeds the threshold, the bsc is added to the current configuration; else the method proceeds to 414. In step 414, the next bsc in the chromosome is designated as the current bsc. The bsc's are considered in a cyclic order, where on reaching the end of the chromosome, the method begins from the first bsc in the chromosome.

The pseudo-code for the method of FIG. 4 is shown below. In this pseudo-code, the terms config and chromosome are used interchangeably. They both refer to the configuration being generated. The term chromsize stands for chromosome-size and it is the same as NUMBSC, the number of bsc's.

```
noop_count = 0; /* the number of times a valid bsc was not chosen */
jstart = random number in the range [0, chromsize)
for (j = jstart; j < chromsize; j = (j+1)%chromsize)
{
    Let bsc = the bsc in the j'th position
    Let config = the configuration chosen so far
    If bsc has been chosen or has been marked unavailable, continue
    Check config+bsc against the global constraints (storage, IPT)
    If it fails either, mark bsc unavailable, and continue
    /* At this point the bsc is eligible to be added to config */
    if (flip(0.5))
    {
        add bsc to config by setting the j'th bit in the chromosome and
calculate remaining storage
    }
    else
    {
        noop_count++;
        if (nooop_count > 2 *chromsize)
        {
            add bsc to config by setting the j'th bit in the chromosome and
calculate remaining storage
        }
    }
}
```

In the FIG. 4 embodiment of the present invention, once the loop executes a 2*chromsize times, then all valid bsc's from that point will be forcibly chosen for inclusion in the configuration. Also, in the FIG. 4 embodiment of the present invention, all regions of the feasible space are probed evenly to generate candidates. This is ensured by starting at a random starting point. Thus, in the FIG. 4 embodiment of the present invention, the classic SGA method of generating a configuration for the initial population has been modified to generate configurations that satisfy the storage and IPT-constraints in a manner which is fast, efficient and fair to all the bsc's.

Figure 5:
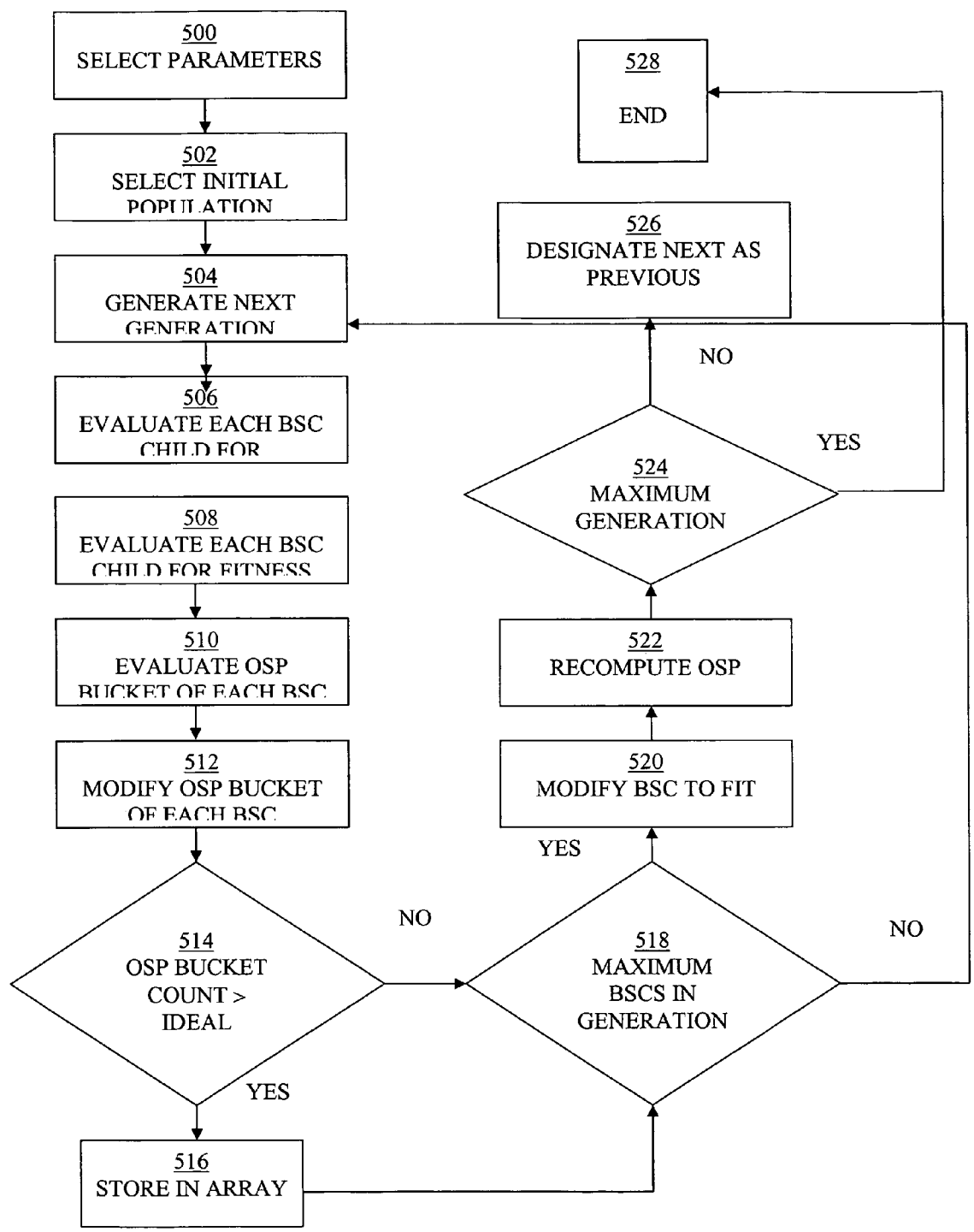

FIG. 5 depicts a method of selecting a configuration that minimizes cost subject to the constraints. In the FIG. 5 embodiment of the present invention, the method employs a refinement of the method shown in FIG. 3. The refinement is done with an addition of a technique called Optimal-Storage-Profiling. The motivation for this refinement is as follows.

The algorithm in FIG. 4 worked pretty well and succeeded in generating good solutions with all manner of storage-constraints. Usually, the best candidate was generated quite early on, such as within the first 5 generations or so. The average fitness of each generation also increased in the beginning generations and then leveled off. But while the method produces many fit individuals in each generation, it also produces a sizable percentage of unfit (i.e. low-fitness) individuals. These individuals will have configurations in which only a few bsc's have been chosen, and will be characterized by having a low storage. One simple way to get rid of such configurations is to enhance the storage-constraint check in the SGA inner loop from the current:

if config's storage is greater than storage-constraint
    drop bsc's from config till the storage-constraint is satisfied and accept the resulting configuration
else
    accept the configuration as is.

to something like this:

if config's storage is greater than storage-constraint
    drop bsc's from config till the storage-constraint is satisfied and accept the resulting configuration
else
    add bsc's until storage-constraint is satisfied, and accept the resulting configuration.

The problem with this approach is it implicitly assumes that higher-storage configurations are more fit. This is not necessarily true, especially if creation-cost is enabled. In many cases, the best configuration consumes only between 60-85% of the storage-limit specified by the user. This means that we may miss the optimal configuration if we insist that the storage must be fully consumed by the chosen configuration.

To remedy this problem, we need a mechanism to do storage-profiling of configurations and develop a policy which will consider configurations of all storage-consumption levels and favor those configurations whose storage-consumption indicate they more likely to be strong candidates. We introduce a component called the Optimal-Storage-Profiling to accomplish this.

The task of the Optimal-Storage-Profiling (OSP) component is to develop an ideal-distribution of configurations, based on their storage-consumption, for each generation. The basic idea of OSP is to divide the user-supplied storage-limit evenly into a number of buckets and use the buckets to maintain statistics on the configurations whose storage-consumption falls within that bucket's storage-range. These buckets are termed "osp-buckets". An osp-bucket also records the count and the sum-total of the fitness of configurations in that storage-range. We picked 10 as the number of osp-buckets (NUM_OSP_BUCKETS) in our tests; in other words, the user-supplied STORAGE_LIMIT value is divided by 10, and the N'th osp-bucket will contain all the configurations whose storage-consumption falls in the range between $(N-1)*L/10$ and $(N*L)/10$ where L is the storage-limit value.

In the method of FIG. 3, when we populated the configurations in the initial-population, we packed as many bsc's as we could in each configuration that will fit into the storage-limit. But, in the method of FIG. 5, with OSP, we need to generate configurations of different sizes in the initial population. Hence we develop a simple budgeting scheme that starts off all osp-buckets on the same footing and gradually increases the budget (i.e. number of configurations) allocated to stronger (i.e. more highly fit) buckets. The strategy involves generating configurations of different storage-limits in several rounds, and computing an ideal-osp distribution at the end of each round.

In the first round, we start with an equal number (actually 1) of configurations (generated in the same manner as in FIG. 4) in each bucket. In the second round, the top 50% of the buckets get twice the budget as the bottom 50%—i.e. they get two configurations as opposed to one for the bottom 50%. (The rank of an osp-bucket is determined by its average fitness.) This process continues, and we gradually increase the number of configurations allocated to higher-performing osp-buckets till the budget for the highest osp-bucket reaches NUM_OSP_BUCKETS (in which case the budget for the worst osp-bucket will be 1); from which point the budget allocation is not changed, but we still re-compute and re-rank the buckets at the end of each round. Thus at the end of the process of generating the initial population, we have also computed the statistics for each osp-bucket, and developed an ideal osp distribution; i.e. associated with each osp-bucket, we have target number of configurations which should fall into the bucket. This number is called the ideal for that osp-bucket.

In step 500, parameters used by the modified SGA are selected. The parameters include, but are not limited to, population-size ("POPSIZE"), the maximum number of generations ("MAXGEN"), the cross-over probability ("PCROSS"), and the mutation probability ("PMUT"). In step 502, the initial population of configurations are chosen using the OSP strategy discussed above, and designated as a previous generation. Note that all configurations in the initial generation are ensured to be feasible using the same reasoning as in FIG. 4. The initial-population forms the zeroth generation.

In step 504, a subsequent generation of configuration is produced. The subsequent generation is produced from a preceding generation by performing operations including selection, crossover and mutation. The selection operation includes randomly selecting two configurations from the previous population as parents for reproduction. The probability of a configuration being selected as a parent is directly related to its fitness relative to its peers.

The crossover operation includes reproducing the selected parents without crossover or with crossover. Reproduction without crossover includes copying the selected parents. Reproduction with crossover includes selecting a crossover-point in each of the parent configurations, splitting them at that point to produce four sub-strings, and pasting pairs of the sub-strings together to form two children. The mutation operation includes randomly perturbing bits in the children. The probability of the mutation operator is determined by PMUT.

In step 506, each of the children are evaluated to determine whether they satisfy constraints. The constraints include storage and IPT. If a child does not satisfy the IPT constraint, randomly selected acg's are dropped; and if a child does not satisfy the storage constraint, bscs are dropped at random from the configuration. In step 508 each of the bsc children is evaluated for fitness. In step 510, the osp-bucket of each child is determined based on the storage-consumption of the configuration. In step 512, the osp-bucket of the child configuration is modified to include the child; this means its statistics (i.e. the count and average-fitness) are updated In step 514, it is determined whether the count of the osp-bucket is greater than its ideal. If so, the current configuration is designated an "excess config" and its position is recorded in a separate array known as the excess configuration array in step 516.

In step 518, it is determined whether the number of configurations in the current generation has reached POPSIZE. If not, the method returns to step 504. If so, then the method proceeds to step 520. In step 520, each child in the excess configuration array is modified to fit into the storage range of an osp-bucket whose actual number falls short of its ideal and the fitness of each child is re-evaluated. In step 522, the OSP ideal distribution is re-computed for the next generation, based on the updated statistics of each osp-bucket In step 524, it is determined whether the maximum number of generations MAXGEN has been reached. If not, the method proceeds to step 526. If so, then the method proceeds to step 528. In step 526, the subsequent generation is designated as the previous generation and the method returns to step 504. In step 528, the method ends.

In the FIG. 5 embodiment of the present invention, the method starts with an equal number of configurations in each bucket. Subsequently, the top 50% of the buckets get twice the configurations as opposed to one configuration for the bottom 50%. This process continues, and the method gradually increase the number of configurations allocated to higher-performing osp-buckets until the budget for the highest osp-bucket reaches NUM_OSP_BUCKETS. At the end of the method an optimal-storage-profile for the distribution of configurations for subsequent generations is created. For each osp-bucket, the method computes the ideal number of configurations as the product of POPSIZE and the ratio of its average-fitness to the sum-total of the average-fitness of all the buckets. If the actual number of configurations in a bucket exceeds the ideal, then we perform post-processing step at the end of each generation to make them conform to the ideal profile. The pseudo-code for the method of FIG. 5 is as follows.

```
Generate initial-population of feasible candidates, as described above.
for gen:= 1 to MAXGEN do
{
   While current-generation is not full (i.e. less than POPSIZE) do
   {
      Select parents p1, p2 from previous generation
      Apply the crossover operator to obtain children c1, c2
      Apply the mutation operator to c1, c2
      foreach c in {c1, c2} do:
      {
         /* Validate c against the global constraints (storage, IPT) */
         If it fails the IPT-constraint, drop offending acg's at random until
the constraint is satisfied.
         If it fails the storage-constraint, drop bsc's at random until the
constraint is satisfied.
         Evaluate fitness of c and add it to current generation;
         Determine the osp-bucket of c; and adjust the bucket's statistics
         to include c.
         If the osp-bucket's actual count is greater than its ideal, than
record position of c in an
            excess-config-array.
      }
   }
   /* Generate configurations corresponding to the OSP ideal */
   for each config c in the excess-config-array
```

-continued

```
   {
      Modify c to fit into the storage-range of an osp-bucket whose actual
number of configurations falls
         short of its ideal, and re-evaluate fitness of c
   }
   Re-compute OSP ideal distribution for the next generation.
}
```

The method of FIG. 5 worked as well as FIG. 4, and in cases where the user-supplied storage-limit is greater than the optimal, it yielded higher-quality results, as expected. But it does introduce an overhead in the number of configurations generated as part of the OSP post-processing at the end of each generation. Approximately 20-30% more configurations were generated than in FIG. 4.

Based on the observation that the algorithm of FIG. 5 was quite overly conservative and allocating budget to weak osp-buckets even towards the end, we decided to do more aggressive pruning based on an elitist model. The basic idea behind our idea of elitism is to periodically interfere with SGA's "natural processing" by starting with the best candidates generated so far. This was also motivated by the need for improved performance with large workloads.

FIG. 6 depicts a method of selecting a configuration that minimizes cost subject to the constraints. In the FIG. 6 embodiment of the present invention, the method employs a Simple Genetic Algorithm (SGA) modified to incorporate the handling of constraints with Optimal-Storage-Profiling using elitist policies. In the FIG. 6 embodiment of the present invention, the SGA "natural processing" is periodically interfered with by starting with the best candidates generated to sample a larger fraction of the search-space.

In the FIG. 6 embodiment of the present invention, larger values of NUMBSC, such as greater than 10, can require tuning POPSIZE and MAXGEN to provide reasonable coverage of the search-space without increasing execution time. It is evident that if we choose a linear dependence on NUMBSC for both parameters, we will get a quadratic increase in the execution time, and a quadratic run-time is quite good when the underlying search-space grows exponentially. The following shows the functions that can be selected for POPSIZE and MAXGEN to provide reasonable coverage. Here we designate NUMBSC by n. Notice that as n increases, the method decreases the constants of proportionality.

$$POPSIZE = 100 \quad \text{for } n < 10$$
$$= 10 * n \quad \text{for } 10 <= n$$

$$MAXGEN = 10 \quad \text{for } n < 10$$
$$= 5 * ((n/5) + 1) \quad \text{for } 10 <= n < 25$$
$$= 25 + 3 * ((n/50) + 1) \quad \text{for } 25 <= n$$

The FIG. 6 embodiment of the present invention extends the method of FIG. 5 by incorporating elitism, which is defined as favoring strong candidates over weak ones. The method of FIG. 6 improves the scalability and throughput of the present invention. Throughput includes, but is not limited to, the ability to sample more of the higher fitness regions of the search space thereby leading to higher quality. In the FIG. 6 embodiment of the present invention, a larger size is used for the initial population than for the population in the SGA loop. The initial population is denote by INITIAL_POPSIZE and POPSIZE denotes the population size in the remainder of the program. The initial population is generated in the same manner as before, but at the end of this process we choose the fittest POPSIZE candidates to constitute the initial generation. The method favors strong (more highly fit) candidates over weak candidates. The FIG. 6 embodiment of the present invention also maintains an elite-pool of candidates whose fitness exceeds a certain threshold value. Let us denote ELITE_FIT_THR_PERCENTILE as the percentile value that determines the threshold, such as a value of 20. At the end of the initial generation, the method calculates the initial value of the elite fitness threshold value and updates this value periodically.

In the FIG. 6 embodiment of the present invention, the elite-pool itself is an array of INITIAL_POPSIZE configurations. The purpose of this elite pool is to periodically strengthen the pool of candidates generated by SGA with candidates from the elite pool. The FIG. 6 embodiment of the present invention, adopts two forms of elite replenishment policies, which are referred to as strong and weak policies. The weak replenishment policy is done at the end of every NUM_ELITE_GENS_WEAK generations, whereas the strong replenishment policy is done at the end of every NUM_ELITE_GENS_STRONG generations. The FIG. 6 embodiment of the present invention requires that strong replenishment be done less frequently than the weak, where the values 5 and 15 are selected respectively for the NUM_ELITE_GENS_WEAK and NUM_ELITE_GENS_STRONG parameters.

In step 600, parameters used by the modified SGA are selected. The parameters include, but are not limited to, population-size ("POPSIZE"), the maximum number of generations ("MAXGEN"), the cross-over probability ("PCROSS"), and the mutation probability ("PMUT"). In step 602, the initial population of configurations are randomly chosen and designated as a previous generation. In the FIG. 6 embodiment of the present invention, the configurations are provided as bit-strings. In the FIG. 6 embodiment of the present invention, all configurations are ensured to be feasible by performing storage-constraint and IPT-checks. The generation of feasible candidates is discussed in FIG. 4. The initial-population forms the zeroth generation.

In step 604, a subsequent generation of configuration is produced. The subsequent generation is produced from a preceding generation by performing operations including selection, crossover and mutation. The selection operation includes randomly selecting two configurations from the previous population as parents for reproduction. The probability of a configuration being selected as a parent is directly related to its fitness relative to its peers.

The crossover operation includes reproducing the selected parents without crossover or with crossover. Reproduction without crossover includes copying the selected parents. Reproduction with crossover includes selecting a crossover-point in each of the parent configurations splitting them at that point to produce four sub-strings, and pasting pairs of the sub-strings together to form two children. The mutation operation includes randomly perturbing bits in the children. The probability of which is determined by PMUT.

In step 606, each of the children is evaluated to determine whether they satisfy constraints. The constraints include storage and IPT. If a child does not satisfy the storage constraint, bscs are dropped at random from the configuration. If a child does not satisfy the IPT constraint, acgs that do not satisfy IPT constraint are dropped. In step 608, each of the children is evaluated for fitness. In step 610, include each configuration with a fitness above the elite threshold to an elite pool. In step 612, the osp-bucket of each child is determined. In step 614, the osp-bucket of each child is modified to include the child. In step 616, it is determined whether the count of the osp-bucket of each bsc child is greater than its ideal. If so, the position of the bsc child is stored in an excess configuration array in step 618.

In step 620, it is determined whether the number of configurations in the subsequent generation has reached POPSIZE. If not, the method returns to step 604. If so, then the method proceeds to step 622. In step 622, each child in the excess configuration array is modified to fit into the storage range of an osp-bucket whose actual number falls short of its ideal and the fitness of each child is re-evaluated. In step 624, include each with a fitness above an elite threshold to an elite pool.

In step, 626, it is determined if the generation is associated with a elitist replenishment policy. If so, in step 628 the policy is performed. If not the method proceeds to step 630. In step 630, the OSP ideal distribution is re-computed for the next generation. In step 632, it is determined whether the maximum number of generations MAXGEN has been reached. If not, the method proceeds to step 634. If so, then the method proceeds to step 636. In step 634, the subsequent generation is designated as the previous generation and the method returns to step 604. In step 636, the method ends. The pseudo-code for the method of FIG. 6 is as follows.

```
Generate initial-population of feasible candidates, as described above.
Compute the elite threshold value, and initialize the elite pool with the
top candidates for gen:= 1 to MAXGEN do
{
   While current-generation is not full (i.e. less than POPSIZE) do
   {
      Select parents p1, p2 from previous generation
      Apply the crossover operator to obtain children c1, c2
      Apply the mutation operator to c1, c2
      foreach c in {c1, c2} do:
      {
         /* Validate c against the global constraints (storage, IPT) */
         If it fails the IPT-constraint, drop offending acg's at random until
     the constraint is satisfied.
            If it fails the storage-constraint, drop bsc's at random until the
     constraint is satisfied.
            Evaluate fitness of c and add it to current generation;
            If fitness is above the elite threshold, add c to the elite pool
            Determine the osp-bucket of c; and adjust the bucket's statistics
            to include c.
            If the osp-bucket's actual count is greater than its ideal, than record
     position of c in an
               excess-config-array.
      }
   }
   /* Generate configurations corresponding to the OSP ideal */
   for each config c in the excess-config-array
   {
      Modify c to fit into the storage-range of an osp-bucket whose
   actual number of configurations falls
      short of its ideal, and re-evaluate fitness of c
      If fitness is above the elite threshold, add c to the elite pool
   }
   If generation corresponds to one in which an elitist replenishment
   policy is triggered, perform the
      policy, as described.
      Re-compute OSP ideal distribution for the next generation.
}
```

In the FIG. 6 embodiment of the present invention, the method balances the competing needs of maintaining a highly fit population and of maintaining population diversity. The latter is needed for GA to explore new regions of the search-space. We have also attempted to minimize the storage- and computational-overhead of these policies.

While specific embodiments of the present invention have been illustrated and described, it will be understood by those having ordinary skill in the art that changes can be made to those embodiments without departing from the spirit and scope of the invention.

What is claimed is:

1. A computer-implemented method, employing the Simple Genetic Algorithm (SGA) as a framework, of selecting a configuration that minimizes cost subject to the constraints, the method comprising the steps of:
   applying a mutation operation to a next generation of configurations;
   evaluating each configuration in the next generation for fitness based on costs that include the execution cost of answering queries in a workload using access structures for the configuration, cost to create a new access structure for the configuration and the cost of maintaining access structures for the configuration;
   determining whether the number of configurations in the next generation has reached a population size threshold;
   if not, generating another next generation of configurations and repeating at least application and evaluation steps;
   if so, determining whether the maximum number of generations has been reached a generation size threshold;
   if not, designating the next generation as the previous generation, generating another next generation of configurations and repeating at least application and evaluation steps and repeating at least the generation, application and evaluation steps;
   otherwise provide the configurations.

2. The method according to claim 1, wherein the configuration includes basic configurations having access-structures.

3. The method according to claim 2, wherein each basic configuration is represented by a bit at a particular position in a bit-sting representing the configuration.

4. The method according to claim 2, wherein the access structures can be one of an index, and a materialized view.

5. The method according to claim 1, wherein the constraints include a storage-limit on access structures and a maximum number of indexes per table.

6. The method according to claim 1, wherein the fitness is determined by a formula:

$$\text{Fitness}(C) = \text{Cost}(IC) - \text{Cost}(C), \text{ where } \text{Cost}(C) = \text{Exe} + w1*\text{Maint} + w2*\text{Cre}$$

and Exe corresponds to the execution cost of answering queries in a workload using access structures for the configuration, Cre corresponds to the cost to create a new access structure for the configuration, Maint corresponds to the cost of maintaining access structures for the configuration and $w1$ and $w2$ are weighting-factors and Cost (IC) corresponds to the execution cost of answering queries in the workload using access structures for a configuration existing prior to invoking the method.

7. The method according to claim 1, further comprising randomly selecting the position of a first basic configuration and from which point the initial population of candidates is generated.

8. The method according to claim 7, further comprising counting the number of times a basic configuration satisfies a constraint is not selected.

9. The method according to claim 7, further comprising performing Optimal-Storage-Profiling (OSP) including the steps of:
   dividing a user-supplied storage-limit evenly into a number of buckets;
   using these buckets to maintain statistics on the configurations whose storage consumption falls within that bucket's storage-range;
   recording in each bucket a count and a sum-total of the fitness of configurations in that storage-range;
   assigning each bucket a target number of configuration that should fall into that bucket in proportion to its average fitness relative to the other buckets;
   modifying the configuration generation processing to ensure that the count of configurations present in that bucket equals the target number of configuration that should fall into that bucket; and
   re-computing the ideal distribution for the next generation at the end of processing each generation.

10. The method according to claim 9, further comprising specifying the number of buckets.

11. The method according to claim 9, further comprising performing pruning based on an elitist model including the steps:
   maintaining an elite-pool of candidates whose fitness exceeds a certain threshold percentile-value;
   storing the configurations whose fitness exceeds this threshold in the elite-pool at the end of processing every generation, including the initial generation;
   using the configurations in the elite-pool to replenish naturally generated candidates under different policies.

12. A system, employing the Simple Genetic Algorithm (SGA) as a framework, for selecting a configuration that minimizes cost subject to the constraints, the method comprising:
   a processor operable to execute computer program instructions; and
   a memory operable to store computer program instructions executable by the processor, for performing the steps of:
   applying a mutation operation to a next generation of configurations;
   evaluating each configuration in the next generation for fitness based on costs that include the execution cost of answering queries in a workload using access structures for the configuration, cost to create a new access structure for the configuration and the cost of maintaining access structures for the configuration;
   determining whether the number of configurations in the next generation has reached a population size threshold;
   if not, generating another next generation of configurations and repeating at least application and evaluation steps;
   if so, determining whether the maximum number of generations has been reached a generation size threshold;
   if not, designating the next generation as the previous generation, generating another next generation of configurations and repeating at least application and evaluation steps and repeating at least the generation, application and evaluation steps;
   otherwise provide the configurations.

13. The system according to claim 12 wherein the configuration includes basic configurations having access-structures.

14. The system according to claim 13, wherein each basic configuration is represented by a bit at a particular position in a bit-string representing the configuration.

15. The system according to claim 13 wherein the access structures can be one of an index, and a materialized view.

16. The system according to claim 12 wherein the constraints include a storage-limit on access structures and a maximum number of indexes per table.

17. The system according to claim 12, wherein the fitness is determined by a formula:

$$Fitness(C)=Cost(IC)-Cost(C), \text{ where } Cost(C=Exe+ w1*Maint+w2*Cre}$$

and Exe corresponds to the execution cost of answering queries in a workload using access structures for the configuration, Cre corresponds to the cost to create a new access structure for the configuration, Maint corresponds to the cost of maintaining access structures for the configuration and w1 and w2 are weighting-factors and Cost (IC) corresponds to the execution cost of answering queries in the workload using access structures for a configuration existing prior to invoking the method.

18. The system according to claim 12, further comprising instructions for performing the steps of randomly selecting the position of a first basic configuration and from which point the initial population of candidates is generated.

19. The system according to claim 18, further comprising instructions for performing the steps of counting the number of times a basic configuration satisfies a constraint is not selected.

20. The system according to claim 18, further comprising instructions for performing the steps of performing Optimal-Storage-Profiling (OSP) including the steps of:
dividing a user-supplied storage-limit evenly into a number of buckets;
using these buckets to maintain statistics on the configurations whose storage consumption falls within that bucket's storage-range;
recording in each bucket a count and a sum-total of the fitness of configurations in that storage-range;
assigning each bucket a target number of configuration that should fall into that bucket in proportion to its average fitness relative to the other buckets;
modifying the configuration generation processing to ensure that the count of configurations present in that bucket equals the target number of configuration that should fall into that bucket; and
re-computing the ideal distribution for the next generation at the end of processing each generation.

21. The system according to claim 20, further comprising instructions for performing the steps of specifying the number of buckets.

22. The system according to claim 20, further comprising instructions for performing the steps of pruning based on an elitist model including the steps:
maintaining an elite-pool of candidates whose fitness exceeds a certain threshold percentile-value;
storing the configurations whose fitness exceeds this threshold in the elite-pool at the end of processing every generation, including the initial generation;
using the configurations in the elite-pool to replenish naturally generated candidates under different policies.

23. A computer program product for employing the Simple Genetic Algorithm (SGA) as a framework for selecting a configuration that minimizes cost subject to the constraints comprising:
a computer readable medium;
computer program instructions, recorded on the computer readable medium, executable by a processor, for performing the steps of:
applying a mutation operation to a next generation of configurations;
evaluating each configuration in the next generation for fitness based on costs that include the execution cost of answering queries in a workload using access structures for the configuration, cost to create a new access structure for the configuration and the cost of maintaining access structures for the configuration;
determining whether the number of configurations in the next generation has reached a population size threshold;
if not, generating another next generation of configurations and repeating at least application and evaluation steps;
if so, determining whether the maximum number of generations has been reached a generation size threshold;
if not, designating the next generation as the previous generation, generating another next generation of configurations and repeating at least application and evaluation steps and repeating at least the generation, application and evaluation steps;
otherwise provide the configurations.

24. The computer program product according to claim 23, wherein the configuration includes basic configurations having access-structures.

25. The computer program product according to claim 24, wherein each basic configuration is represented by a bit at a particular position in a bit-sting representing the configuration.

26. The computer program product according to claim 24, wherein the access structures can be one of an index, and a materialized view.

27. The computer program product according to claim 23, wherein the constraints include a storage-limit on access structures and a maximum number of indexes per table.

28. The computer program product according to claim 23, wherein the fitness is determined by a formula:

$$Fitness(C)=Cost(IC)-Cost(C), \text{ where } Cost(C)=Exe+ w1*Maint+w2*Cre$$

and Exe corresponds to the execution cost of answering queries in a workload using access structures for the configuration, Cre corresponds to the cost to create a new access structure for the configuration, Maint corresponds to the cost of maintaining access structures for the configuration and w1 and w2 are weighting-factors and Cost (IC) corresponds to the execution cost of answering queries in the workload using access structures for a configuration existing prior to invoking the method.

29. The computer program product according to claim 23, further comprising randomly selecting the position of a first basic configuration and from which point the initial population of candidates is generated.

30. The computer program product according to claim 29, further comprising counting the number of times a basic configuration satisfies a constraint is not selected.

31. The computer program product according to claim 30, further comprising performing Optimal-Storage-Profiling (OSP) including the steps of:
dividing a user-supplied storage-limit evenly into a number of buckets;
using these buckets to maintain statistics on the configurations whose storage consumption falls within that bucket's storage-range;
recording in each bucket a count and a sum-total of the fitness of configurations in that storage-range;
assigning each bucket a target number of configuration that should fall into that bucket in proportion to its average fitness relative to the other buckets;

modifying the configuration generation processing to ensure that the count of configurations present in that bucket equals the target number of configuration that should fall into that bucket; and re-computing the ideal distribution for the next generation at the end of processing each generation.

32. The computer program product according to claim 31, further comprising specifying the number of buckets.

33. The computer program product according to claim 32, further comprising performing pruning based on an elitist model including the steps:

maintaining an elite-pool of candidates whose fitness exceeds a certain threshold percentile-value;

storing the configurations whose fitness exceeds this threshold in the elite-pool at the end of processing every generation, including the initial generation;

using the configurations in the elite-pool to replenish naturally generated candidates under different policies.

* * * * *

UNITED STATES PATENT AND TRADEMARK OFFICE
CERTIFICATE OF CORRECTION

| | | |
|---|---|---|
| PATENT NO. | : 7,620,609 B2 | Page 1 of 1 |
| APPLICATION NO. | : 11/364344 | |
| DATED | : November 17, 2009 | |
| INVENTOR(S) | : Srinivasan Ramakrishnan | |

It is certified that error appears in the above-identified patent and that said Letters Patent is hereby corrected as shown below:

In column 3, line 51, delete "population." and insert -- population; --, therefor.

In column 4, line 17, delete "electromechanical" and insert -- electro-mechanical --, therefor.

In column 5, line 43, delete "to,:" and insert -- to: --, therefor.

In column 5, line 57-58, after "throughput" insert -- . --.

In column 15, line 35, in claim 3, delete "bit-sting" and insert -- bit-string --, therefor.

In column 16, line 57, in claim 13, after "claim 12" insert -- , --.

In column 16, line 63, in claim 15, after "claim 13" insert -- , --.

In column 16, line 65, in claim 16, after "claim 12" insert -- , --.

In column 17, line 3-4, in claim 17, delete "where Cost(C=" and insert -- where Cost(C)= --, therefor, In column 18, line 25, in claim 25, delete "bit-sting" and insert -- bit-string --, therefor.

Signed and Sealed this

Third Day of August, 2010

David J. Kappos
*Director of the United States Patent and Trademark Office*